(12) United States Patent
Hada

(10) Patent No.: US 9,964,642 B2
(45) Date of Patent: May 8, 2018

(54) VEHICLE WITH SYSTEM FOR DETECTING ARRIVAL AT CROSS ROAD AND AUTOMATICALLY DISPLAYING SIDE-FRONT CAMERA IMAGE

(71) Applicant: TOYOTA MOTOR ENGINEERING & MANUFACTURING NORTH AMERICA, INC., Erlanger, KY (US)

(72) Inventor: Hideki Hada, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days. days.

(21) Appl. No.: 15/015,908

(22) Filed: Feb. 4, 2016

(65) Prior Publication Data
US 2017/0227637 A1    Aug. 10, 2017

(51) Int. Cl.
| | |
|---|---|
| *G01S 17/93* | (2006.01) |
| *G01S 13/93* | (2006.01) |
| *G01S 15/93* | (2006.01) |
| *G01S 17/02* | (2006.01) |
| *G01S 17/87* | (2006.01) |
| *G01S 15/02* | (2006.01) |

(Continued)

(52) U.S. Cl.
CPC .......... *G01S 13/931* (2013.01); *G01S 13/867* (2013.01); *G01S 13/87* (2013.01); *G01S 15/025* (2013.01); *G01S 15/87* (2013.01); *G01S 15/931* (2013.01); *G01S 17/023* (2013.01); *G01S 17/87* (2013.01); *G01S 17/936* (2013.01); *G08G 1/166* (2013.01); *G01S 2013/9332* (2013.01); *G01S 2013/9364* (2013.01); *G01S 2013/9367* (2013.01); *G01S 2013/9375* (2013.01)

(58) Field of Classification Search
None
See application file for complete search history.

(56) References Cited

U.S. PATENT DOCUMENTS

| | | |
|---|---|---|
| 7,385,486 B2 | 6/2008 | Danz et al. |
| 7,830,243 B2 | 11/2010 | Buckley et al. |

(Continued)

FOREIGN PATENT DOCUMENTS

JP    2011242860 A    12/2011

*Primary Examiner* — Thomas G Black
*Assistant Examiner* — Demetra R Smith-Stewart
(74) *Attorney, Agent, or Firm* — Oblon, McClelland, Maier & Neustadt, L.L.P.

(57) ABSTRACT

A vehicle includes a proximity sensor that senses a distance to objects located to at least one side of the vehicle, a camera mounted at the front of the vehicle, a display for displaying video from the camera, and processing circuitry that detects a transition of the vehicle from surroundings of the vehicle in which at least one object located to the side of the vehicle is within a predetermined proximity threshold distance to surrounding of the vehicle in which no objects are located to the side of the vehicle within the predetermined proximity threshold distance, and in response to determining that, at least, the proximity sensor has detected the transition, the processing circuitry is configured to display video from the camera on the display of the vehicle. Additional criteria for displaying the video can include vehicle speed, distance traveled prior to the transition, duration for which the state prior to the transition was maintained, and the state of the vehicle's turn signal.

14 Claims, 12 Drawing Sheets

(51) Int. Cl.
  *G01S 13/86* (2006.01)
  *G01S 13/87* (2006.01)
  *G01S 15/87* (2006.01)
  *G08G 1/16* (2006.01)

(56) References Cited

U.S. PATENT DOCUMENTS

| | | | |
|---|---|---|---|
| 8,031,062 B2* | 10/2011 | Smith | G08G 1/166 340/438 |
| 8,232,872 B2 | 7/2012 | Zeng | |
| 8,493,195 B2* | 7/2013 | Lee | B60Q 9/008 340/435 |
| 8,552,848 B2 | 10/2013 | Rao et al. | |
| 8,810,719 B2* | 8/2014 | Hsu | G06F 1/3231 348/333.13 |
| 8,862,380 B2 | 10/2014 | Jung | |
| 9,104,535 B1* | 8/2015 | Brinkmann | B60W 40/09 |
| 9,428,185 B2* | 8/2016 | Yellambalase | B60W 30/08 |
| 9,511,711 B2* | 12/2016 | Petrillo | B60R 1/00 |
| 2005/0073433 A1* | 4/2005 | Gunderson | B60Q 9/006 340/903 |
| 2006/0071764 A1* | 4/2006 | Lynch | B60Q 9/008 340/435 |
| 2007/0109406 A1* | 5/2007 | Schofield | B60N 2/002 348/116 |
| 2010/0117813 A1* | 5/2010 | Lee | B60Q 9/008 340/435 |
| 2011/0128136 A1 | 6/2011 | Katoh et al. | |
| 2012/0221207 A1* | 8/2012 | Nakamura | G01C 21/3407 701/41 |
| 2015/0051753 A1 | 2/2015 | Kawamata et al. | |
| 2015/0266421 A1* | 9/2015 | Brubaker | B60R 1/00 348/148 |
| 2015/0274074 A1* | 10/2015 | Petrillo | B60R 1/00 701/36 |

\* cited by examiner

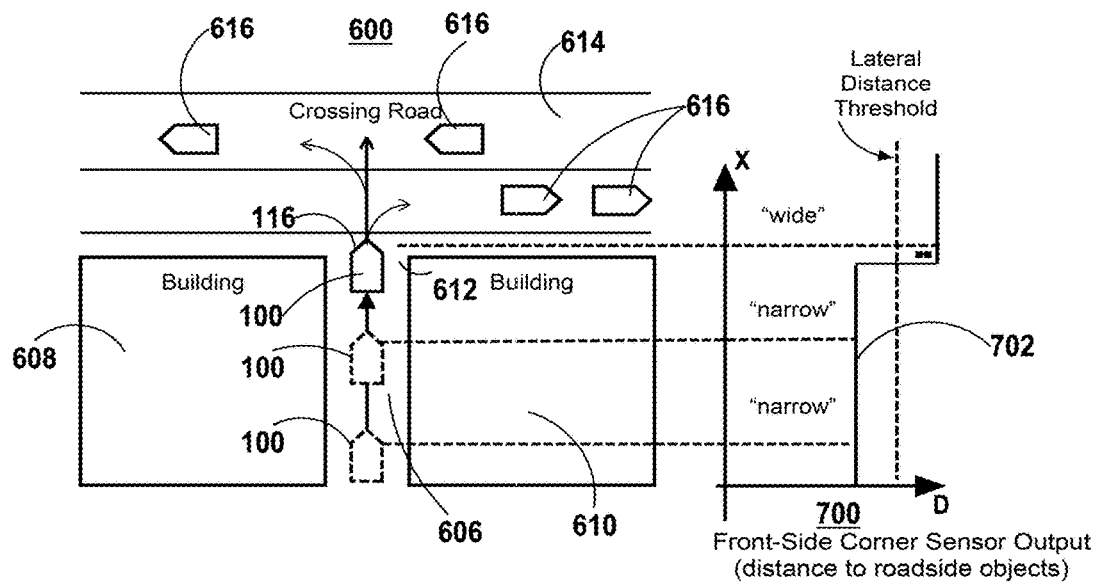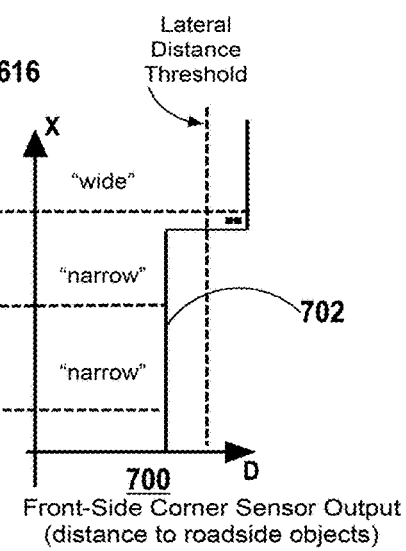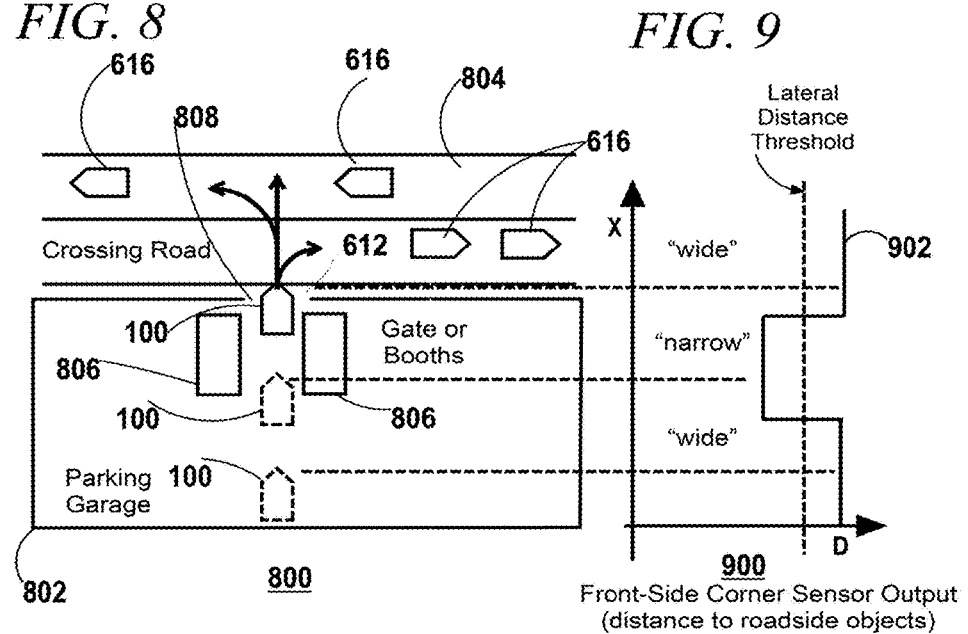

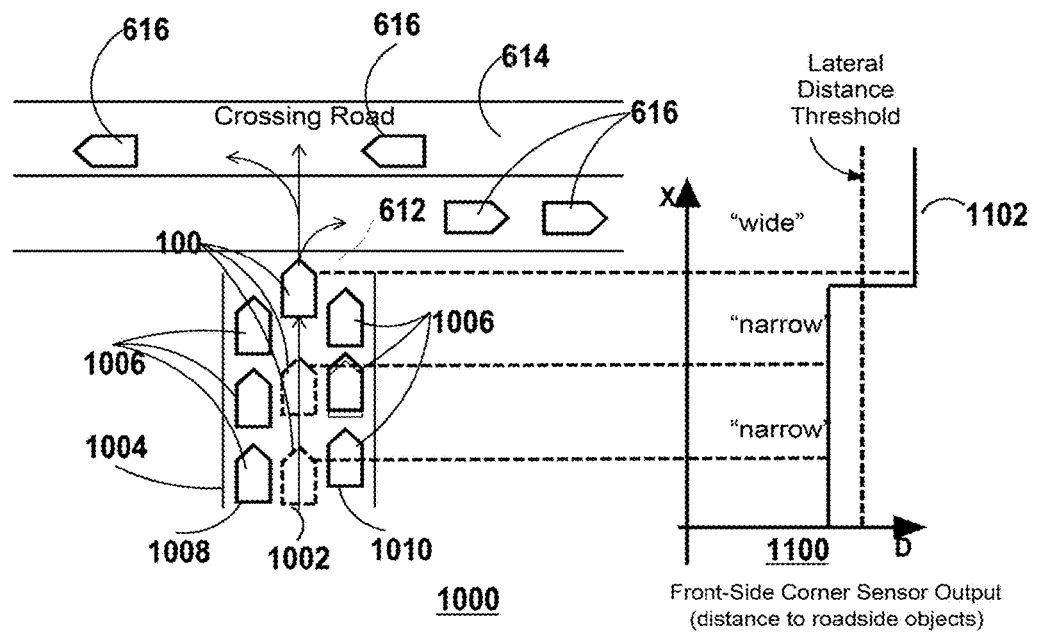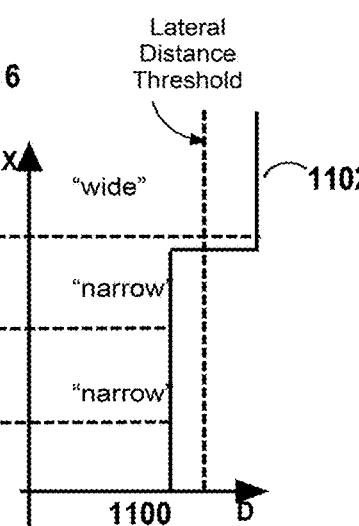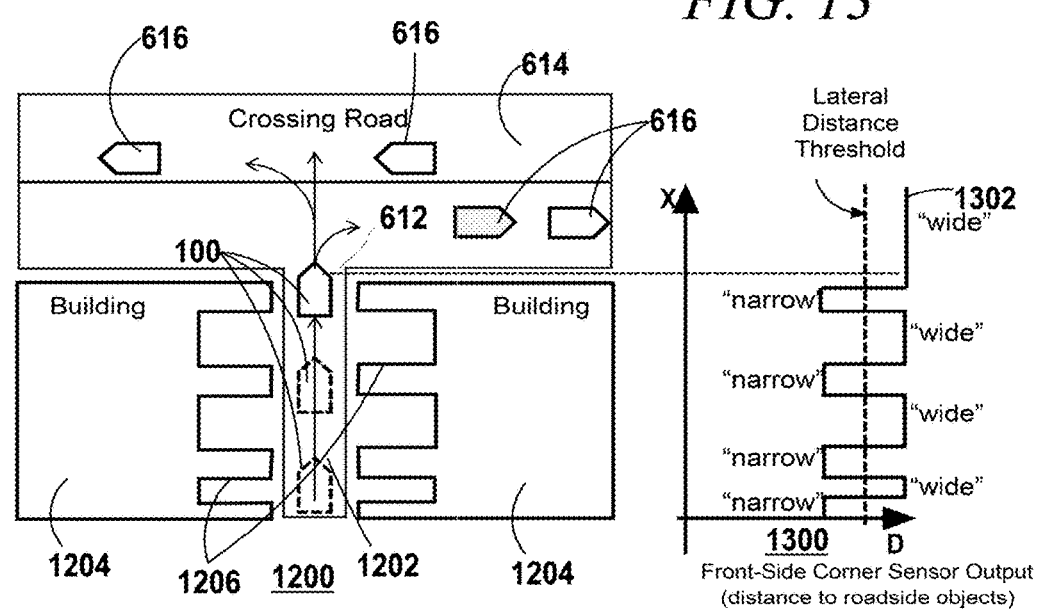

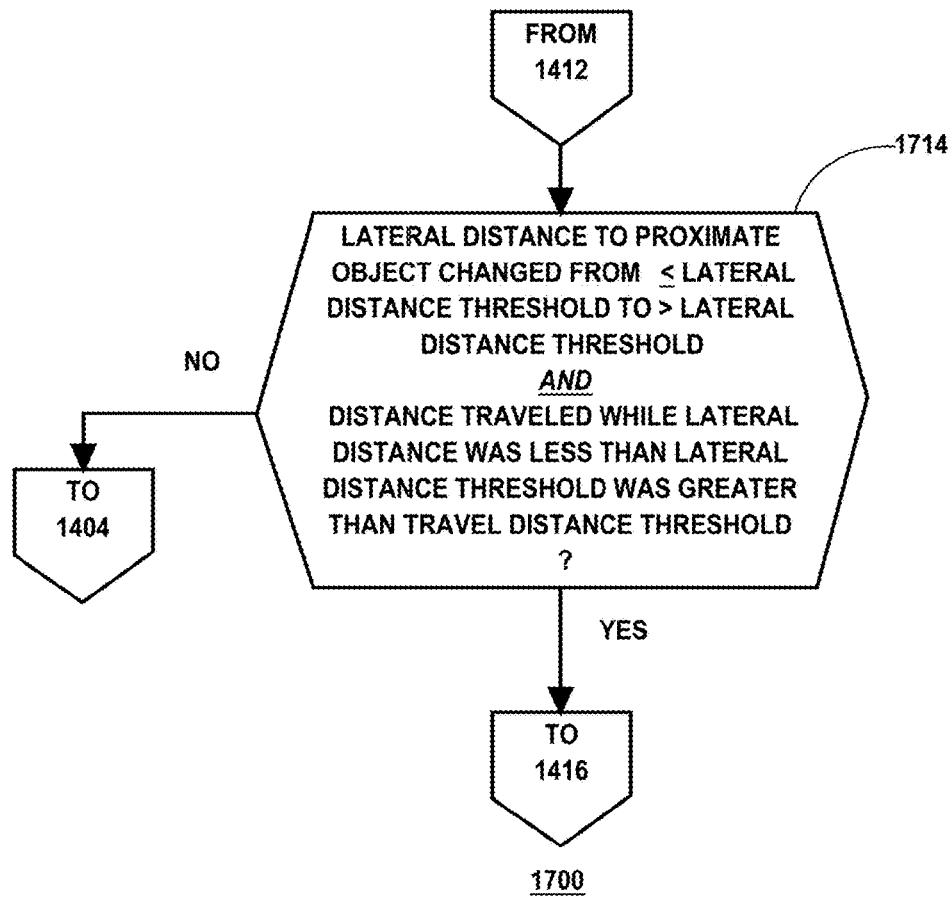

VEHICLE WITH SYSTEM FOR DETECTING ARRIVAL AT CROSS ROAD AND AUTOMATICALLY DISPLAYING SIDE-FRONT CAMERA IMAGE

FIELD OF THE DISCLOSURE

This disclosure relates to vehicle safety systems.

BACKGROUND OF THE DISCLOSURE

A significant fraction of car accidents and a significant fraction of accident fatalities occur at intersections. Certain intersections are more dangerous due to the poor visibility with respect to cars approaching on cross roads from the perspective of a driver in a car stopped at the intersection. This may be due to the curvature of intersecting roads or due to the presence of objects such as parked cars, a building, a fence, a wall, trees or hedges near the intersection. The stopping point for cars at intersections is selected to keep stopped vehicles spaced at a safe distance from traffic on cross streets, but unfortunately may not afford a clear view of such traffic from the perspective of the driver's seat.

In the past there were efforts to address the problem by placing a wide angle camera at the front of a vehicle and routing the video feed from the camera to the vehicle's navigation display.

Additionally there have been efforts to automatically issue warnings to drivers. For example, U.S. Patent Publication 2015/0051753 to Kawamata et al. discloses providing a level of driving assistance in the form of warning lights or audio that is dependent on whether or not obstacles are detected at an intersection. Obstacles are detected using sound emitted by the vehicle and a set of microphones.

SUMMARY OF THE DISCLOSURE

Certain embodiments described herein include a vehicle including: a front; a first side; a second side; a proximity sensor configured to sense a distance to objects located to at least one of the first side and the second side of the vehicle; a camera mounted at the front of the vehicle, the camera configured to include a field of view that includes a view to at least one of the first side and the second side of the vehicle; a display in the vehicle; processing circuitry coupled to the proximity sensor, the camera, and the display, wherein the processing circuitry is configured to: determine that, at least, the proximity sensor has detected a transition of the vehicle from surroundings of the vehicle in which at least one object located to at least one of the first side of the vehicle and the second side of the vehicle is within a predetermined proximity threshold distance to surrounding of the vehicle in which no objects are located to the at least one of the first side of the vehicle and the second side of the vehicle within the predetermined proximity threshold distance; and in response to determining that, at least, the proximity sensor has detected the transition, the processing circuitry is configured to display video from the camera on the display of the vehicle.

In determining that, at least, the proximity sensor has detected the transition, the processing circuitry can be further configured to determine that prior to the transition the vehicle was traveling at a speed less than a predetermined speed threshold, and displaying the video from the camera on the display can also be conditioned on the vehicle having been traveling at the speed less than the predetermined speed threshold prior to the transition.

In determining that, at least, the proximity sensor has detected the transition, the processing circuitry can be further configured to determine that prior to the transition, the vehicle had traveled a distance at least equal to a predetermined travel distance while the vehicle was in the surroundings of the vehicle in which at least one object was located to at least one of the first side of the vehicle and the second side of the vehicle within the predetermined proximity threshold distance and displaying the video from the camera on the display can also be conditioned on the vehicle having traveled the distance equal to the predetermined travel distance while the vehicle was in surroundings of the vehicle in which at least one object was located to at least one of the first side of the vehicle and the second side of the vehicle within the predetermined proximity threshold distance.

In determining that, at least, the proximity sensor has detected the transition, the processing circuitry can be further configured to determine that prior to the transition, for at least a predetermine period of time the vehicle was in the surroundings of the vehicle in which at least one object was located to at least one of the first side of the vehicle and the second side of the vehicle within the predetermined proximity threshold distance.

In determining that, at least, the proximity sensor has detected the transition, the processing circuitry can be further configured to determine if a turn signal of the vehicle has been activated.

According to certain embodiments, the proximity sensor can have a horizontal field that has a horizontal angular extent of 10° to 20°.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 is a first schematic representation of a driving environment illustrating a first scenario in which systems for controlling a camera and a display at intersections are used;

FIG. 7 is a graph including a plot of measured lateral distance to proximate objects versus vehicle position for the first scenario illustrated in FIG. 6;

FIG. 8 is a second schematic representation of a driving environment illustrating a second scenario in which systems for controlling a camera and a display at intersections are used;

FIG. 9 is a graph including a plot of measured lateral distance to proximate objects versus vehicle position for the second scenario illustrated in FIG. 8;

FIG. 10 is a third schematic representation of a driving environment illustrating a third scenario in which systems for controlling a camera and a display at intersections are used;

FIG. 11 is a graph including a plot of measured lateral distance to proximate objects versus vehicle position for the third scenario illustrated in FIG. 10;

FIG. 12 is a fourth schematic representation of a driving environment illustrating a fourth scenario in which systems for controlling a camera and a display at intersections are used;

FIG. 13 is a graph including a plot of measured lateral distance to proximate objects versus vehicle position for the fourth scenario illustrated in FIG. 12;

FIG. 15 is a table representing a first-in-first-out memory buffer of lateral distance measurements that is used in practicing the method shown in FIG. 14;

FIG. 16 is a table representing a first-in-first-out memory buffer of vehicle speed that is used in practicing the method shown in FIG. 14;

FIG. 17 is portion of a flowchart including an alternative condition that may be substituted into the flowchart shown in FIG. 14 according to fourth example of a method of controlling a camera and a display of a vehicle;

DETAILED DESCRIPTION OF THE PREFERRED EMBODIMENTS

Figure 1:
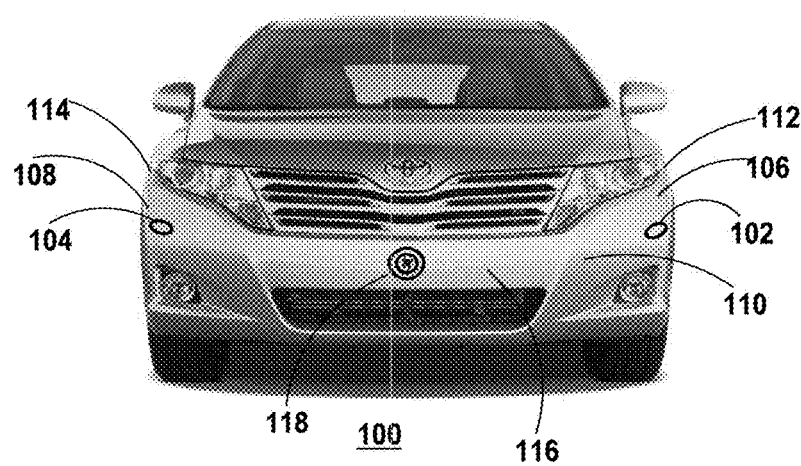
FIG. 1 is a front view of a vehicle equipped with an automatic system for controlling a camera and a display at traffic intersections.

Referring now to the drawings, wherein like reference numerals designate identical or corresponding parts throughout the several views.

Figure 2:
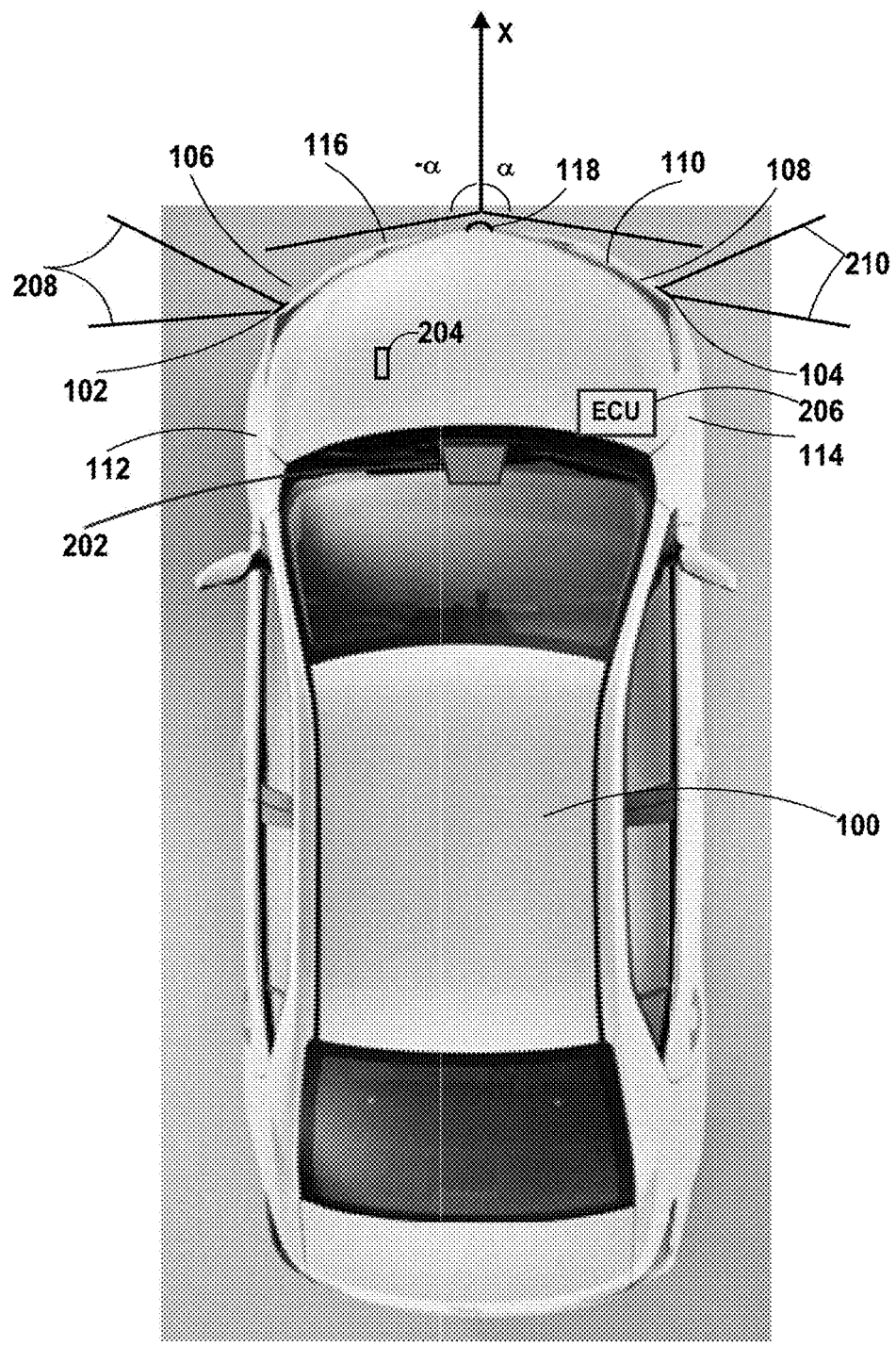
FIG. 2 is a top view of the vehicle shown in FIG. 1.

FIG. 1 is a front view of a first vehicle 100 equipped with an automatic system 300 (FIG. 3) for controlling a camera 118 and a display 202 (FIG. 2) at traffic intersections and FIG. 2 is a top view of the first vehicle 100 shown in FIG. 1. The first vehicle 100 includes a left (from the perspective of the driver) side looking proximity sensor 102 and a right side looking proximity sensor 104 mounted respectively in a left side 106 and a right side 108 of a front fascia 110 of the first vehicle 100. Alternatively, the proximity sensors 102, 104 could be mounted in a left fender 112 and a right fender 114 respectively of the first vehicle 100. The proximity sensors 102, 104 are suitably located forward of the front wheel opening of the first vehicle 100, so as to be better positioned to sense an opening up the region around a front 116 of the first vehicle 100 when the first vehicle 100 reaches a traffic intersection. The camera 118 is suitably a panoramic camera and is mounted pointing forward at the center of the front fascia 110 of the first vehicle 100.

Alternatively, multiple cameras can be used in place of the panoramic camera 118. Image stitching can be used to combine images from multiple cameras. For example a pair of cameras including one pointed somewhat (though not necessarily exactly, for example at a 45° angle with respect to a vehicle forward direction) toward the left side of the first vehicle 100 and one pointed somewhat (though not necessarily exactly, for example at a 45° angle with respect to a vehicle forward direction) toward the right side of the first vehicle 100 can be used in lieu of a panoramic camera.

As shown in FIG. 2 the first vehicle 100 also includes a dashboard mounted display 202 which is used to display video from the camera 118, a vehicle speed sensor 204 for sensing the speed of the first vehicle 100 and an electronic control unit (ECU) 206. Symmetric angles $\alpha$ and $-\alpha$ which are measured from an X-axis that is aligned with a longitudinal axis of the first vehicle 100 indicate a horizontal field of view of the camera 118. The vertical field of view may for example be 10-20 degrees. A pair of lines 208 extending from the left side looking proximity sensor 102 indicated an approximate field of view of the left side looking proximity sensor 102. Similarly a pair of lines 210 extending from the right side looking proximity sensor 104 indicate an approximate field of view of the right side looking proximity sensor 104.

According to an alternative design only one of the side looking proximity sensors 102, 104 is used. For example in countries where vehicles are driven on the right side of the road optionally a system can include only the right side looking proximity sensor 104 and in countries where vehicles are driven on the left side of the road optionally the system 300 (FIG. 3) can include only the left side looking proximity sensor 102. Even if vehicles equipped with the system 300 (FIG. 3) include both proximity sensors 102, 104 the system 300 (FIG. 3) may only use one.

Figure 3:
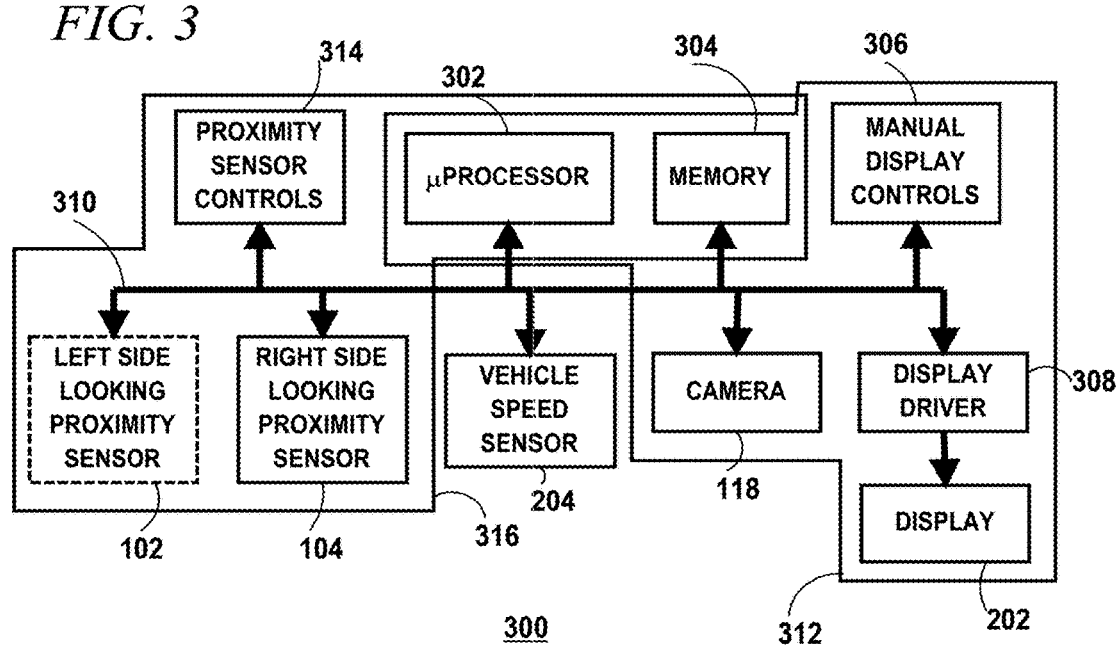
FIG. 3 is a block diagram of the automatic system for controlling the camera and the display that are included in the vehicle shown in FIG. 1 and FIG. 2.

FIG. 3 is a block diagram of the automatic system 300 for controlling the camera 118 and the display 202 that are included in the first vehicle 100 shown in FIG. 1 and FIG. 2. The system 300 comprises a microprocessor 302, a memory 304, one or more manual display controls 306, the left side looking proximity sensor 102, the right side looking proximity sensor 104, proximity sensor controls 314, the vehicle speed sensor 204, the camera 118 and a display driver 308 coupled together through a signal bus 310. The display driver 308 is coupled to the display 202. The microprocessor 302 executes a program stored in the memory for controlling the camera 118 and the display driver 308 and selectively coupling a video feed from the camera 118 to the display driver 308 which in turn drives the display 202 in order to display the video feed. The memory 304 is one form of non-transitory computer readable medium that may be used to store the aforementioned program. The one or more manual display controls 306 and the proximity sensor controls 314 can, for example, comprise physical buttons, or virtual GUI buttons that are actuated via a touch screen of the display 202. The manual display controls 306 can be used to override automatic control of the a camera system 312, which is described herein below, should a driver choose to do so. The proximity sensor controls 314 can be used to turn on and turn off the proximity sensors 102, 104. As shown in FIG. 3 the left side looking proximity sensor 102 is indicated as being optional which, as discussed above, is appropriate for countries in which vehicles are driven on the right side of the road. The proximity sensors 102, 104 can, for example, comprise sonar, radar and/or lidar. The left side looking proximity sensor 102, the right side looking proximity sensor 104

(whichever of the two is present), the proximity sensor controls 314, the microprocessor 302 and the memory 304 make up a proximity sensor system 316. The microprocessor 302 and the memory 304 can be included in the ECU 206. The microprocessor 302 is one form of processing circuitry. Possible alternative forms of processing circuitry include, by way of nonlimitive example, an Application Specific Integrated Circuit (ASIC), a Field Programmable Gate Array (FPGA), a microcontroller and/or discrete logic. Optionally the first vehicle 100 can include multiple separate microprocessors and/or microcontrollers that handle different control functions. The microprocessor 302, the memory 304, the camera 118, the display driver 308, the display 202 and the manual display controls 306 are parts of a camera system 312. Note however that the microprocessor 302 and the memory 304 also perform functions outside of the camera system 312.

Figure 4:
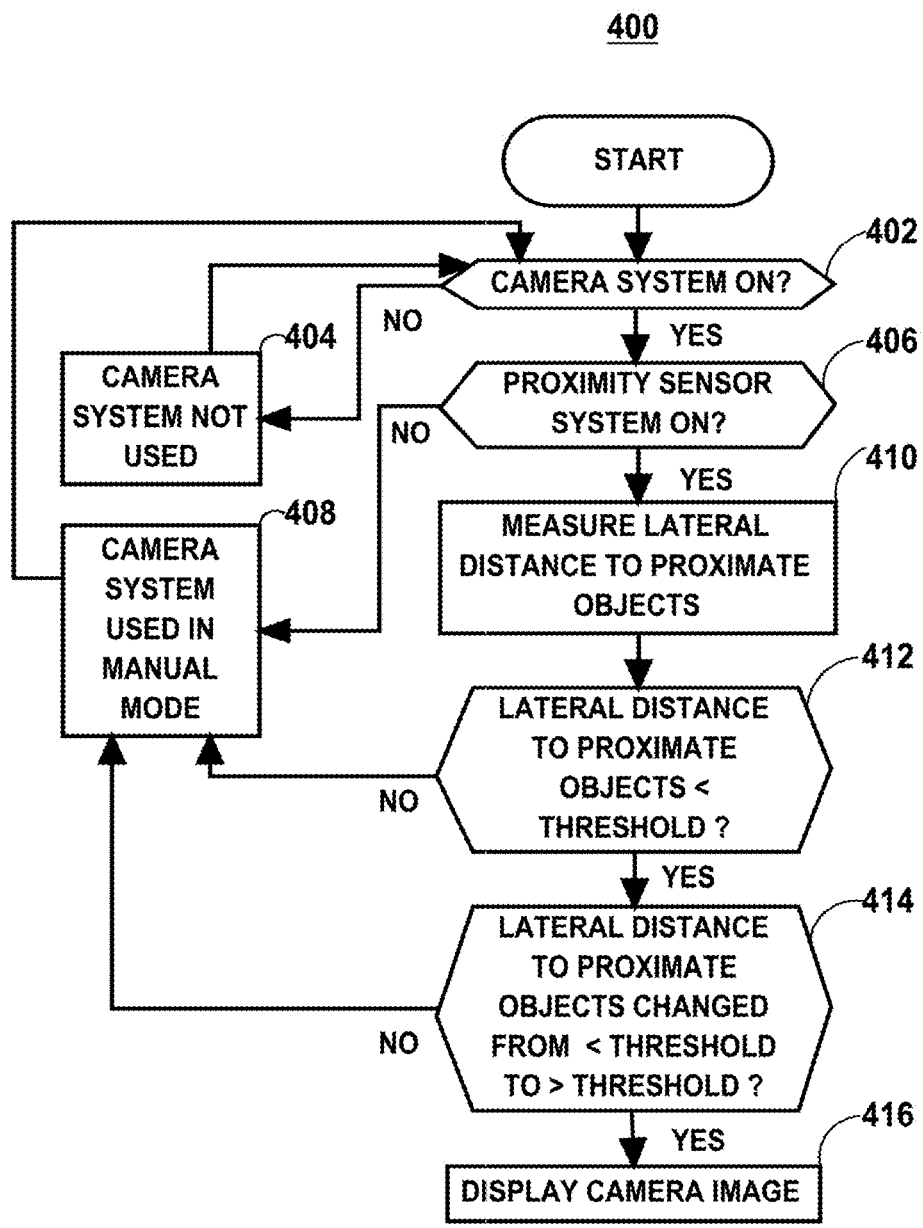
FIG. 4 is flowchart of a first method of controlling the camera and the display of the vehicle shown in FIGS. 1-2 according to a first example provided in the present disclosure.

FIG. 4 is a flowchart of a first method 400 of controlling the camera system 312 of the first vehicle 100 according to a first example provided in the present disclosure. The method 400 commences with decision block 402 which determines if the camera system 312 of the first vehicle 100 has been turned on. An occupant (e.g., a driver) of the first vehicle 100 can turn on the camera system 312 by operating the manual display controls 306. If the outcome of decision block 402 is negative, then the method 400 branches to block 404 which signifies a state of the system 300 in which the camera system 312 is not used. Within the state in which the camera is not used 404, the system 300 continues to check the outcome of block 402 to determine if the camera system 312 is turned on. When the outcome of decision block 402 is positive, the method 400 continues to decision block 406 the outcome of which depends on whether the proximity sensor system 316 is turned on. If the outcome of decision block 406 is negative, then the method 400 branches to block 408 which indicates a state of the system 300 in which the camera system 312 is used in manual mode. Within the state 408 in which the camera system 312 is used in manual mode, the system 300 continues to test the outcome of decision blocks 402 and 406 in order to handle user operation of the manual display controls 306 and the proximity sensor controls 314. If, on the other hand, the outcome of decision block 406 is positive, then in block 410 the proximity sensor system 316 is used to measure the lateral distance to proximate objects. The proximate objects can, for example, be cars parked in a parking lane of a street on which the first vehicle 100 is driving, building walls, gates or booths in a parking garage or other structures on the side of a street or driveway.

Next decision block 412 tests if the lateral distance to proximate objects is less than a programmed lateral distance threshold. A positive outcome of decision block 412 is construed to signify that the first vehicle 100 is traveling along a road and has not yet reached an intersection. The programmed threshold can be made dependent on other factors, such as for example a location estimate for the vehicle or the average speed of the vehicle. The location estimate can be obtained from location services such as provided by cellular networks, Wi-Fi networks or satellite navigation services (e.g., GPS, GLONASS, BeiDou, Galileo). The lateral distance threshold can be set in accordance with stored information for a road that the vehicle 100 is traveling on as determined by the location services. When the outcome of decision block 412 is negative the method 400 branches to block 408 signifying the aforementioned state in which the camera system 312 is used in manual mode. While in manual mode the driver can use the manual display controls 306 to control the display 202. When the outcome decision block 412 is positive, the method 400 proceeds to decision block 414 the outcome of which depends on whether the lateral distance to proximate objects changed from less than the programmed lateral distance threshold to greater than the programmed lateral distance threshold. Note that it can also be deduced that the lateral distance to proximate objects is beyond the programmed lateral distance if the programmed lateral distance is less than a maximum sensing range of the proximity sensor system 316 and nothing is detected by the proximity sensor system 316. If the outcome of decision block 414 is negative the system 300 returns to the state in which the camera system 312 is used in manual mode 408 and continues executing blocks 402 et seq. When the outcome of decision block 414 is positive the method 400 proceeds to block 416 in which the camera system 312 displays video being acquired by the camera 118 on the display 202. A positive outcome of decision block 414 is construed to mean that the first vehicle 100 has reached an intersection where a region to the side of the front of the first vehicle 100 which is being probed by the proximity sensor system 316 does not include objects within the programmed lateral distance threshold.

Figure 5:
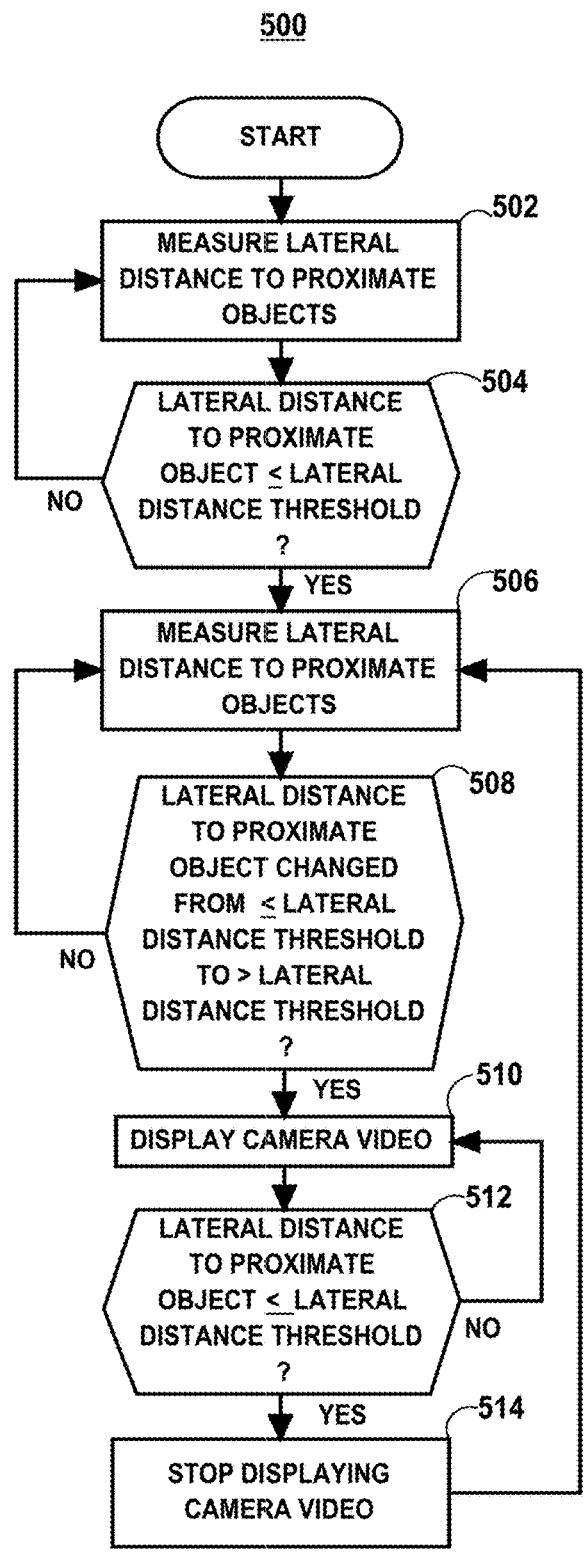
FIG. 5 is a flowchart of a second method of controlling the camera and the display of a vehicle shown in FIGS. 1-2 according to a second example provided in the present disclosure.

FIG. 5 is a flowchart of a second method 500 of controlling a camera system e.g., 312 of a vehicle e.g., 100 according to a second example. In block 502 the lateral distance to proximate objects is measured. Next decision block 504 tests if the lateral distance to proximate objects is less than a predetermined lateral distance threshold. If the outcome of decision block 504 is negative then the method 500 loops back to block 502 and continues executing as just described. When the outcome of decision block 504 is positive, the method proceeds to block 506 which again measures the lateral distance to proximate objects. Next decision block 508 tests if the lateral distance to proximate objects changed from less than the predetermined lateral distance threshold to greater than the predetermined lateral distance threshold. If the outcome of decision block 508 is negative then the method 500 loops back to block 506 and continues executing as described above. When the outcome of decision block 508 is positive indicating that the vehicle, e.g., 100 in which the method 500 is being executed has reached a traffic intersection, the method 500 proceeds to block 510 in which a video feed from a camera, e.g., 118 of the vehicle, e.g., 100 is displayed on a display, e.g., 202 of the vehicle, e.g., 100. Next decision block 512 tests if the lateral distance to proximate objects is again less than the predetermined lateral distance threshold. If the outcome of decision block 512 is negative then the method loops back to block 512 and continues displaying the video feed on the camera. When the outcome of decision block 512 is affirmative, the method 500 proceeds to block 514 in which the displaying of the video feed from the camera is stopped. Next the method 500 loops back to block 506 and continues executing as previously described. According to certain alternative embodiments the lateral distance threshold used in blocks 504 and 512 are different.

FIG. 6 is a first schematic representation of a driving environment illustrating a first scenario 600 in which the system 300 for controlling the camera 118 and the display 202 at intersections is used. The first vehicle 100 is driving on a one-way street 606 between a first building 608 and a second building 610. In the bottom and middle positions of the first vehicle 100 (drawn with a dashed outline) the proximity sensor system 316 detects the buildings 608, 610 spaced laterally from the vehicle but within the aforementioned lateral distance threshold. When the first vehicle 100 has reached an intersection 612 with a cross street 614, the system 300 will detect opening up of the region to the sides of the front 116 of the first vehicle 100 and the video feed from the camera 118 will be displayed on the display 202. The driver (not shown) of the first vehicle 100 will be able to see additional vehicles 616 which are driving on the cross street 614 on the display 202 without having to advance the first vehicle 100 dangerously into the cross street 614

FIG. 7 is a graph 700 including a plot 702 of measured lateral distance to proximate objects versus position of the first vehicle 100 for the first scenario illustrated in FIG. 6. In FIGS. 7, 9, 11 and 13, an X-axis (abscissa) of each graph 700, 900, 1100, 1300 indicates a position of the first vehicle 100 and a D-axis (ordinate) of each graph 700, 900, 1100, 1300 indicates the lateral distance to proximate objects measured by the proximity sensor system 316. As shown in FIG. 7 the lateral distance to proximate objects increases as the first vehicle 100 passes beyond the buildings 608, 610 at the intersection 612.

FIG. 8 is a second schematic representation of a driving environment illustrating a second scenario 800 in which the system 300 for controlling the camera 118 and the display 202 at intersections is used. In the second scenario 800 the first vehicle 100 is driving out of a parking garage 802 onto a cross street 804. A gate or pair of booths 806 are located proximate an exit 808 of the parking garage 802. The vehicle 100 must pass the gate or pair of booths 806. FIG. 9 is a graph 900 including a plot 902 of measured lateral distance to proximate objects versus position of the vehicle 100 for the second scenario illustrated in FIG. 8. While the front 116 of the first vehicle 100 is beside the gate or pair of booths 806, the proximity sensor system 316 detects the gate or pair of booths as reflected in the plot 902. Once the front 116 of the first vehicle 100 passes the gate or pair of booths 806 the proximity sensor system 316 will detect an opening up of the area around the front 116 of the first vehicle 100 and the system 300 will display video from the camera 118 on the display 202.

FIG. 10 is a third schematic representation of a driving environment illustrating a third scenario 1000 in which the system 300 for controlling the camera 118 and the display 202 at intersections is used. In the third scenario 1000 the first vehicle 100 is driving in a center driving lane 1002 of a road 1004 that has cars 1006 parked in left side parking lane 1008 and a right side parking lane 1010. The left proximity sensor field of view 208 and the right proximity sensor field of view are sufficiently wide relative to the spacing between the parked cars 1006 that the proximity sensor system 316 does not detect the small gaps between the parked cars 1006. However when the first vehicle 100 passes the parked cars 1006 and reaches the intersection 612 with the cross street 614 the proximity sensors system 316 detects an opening up of the region to the side of the front 116 of the first vehicle 100 and in response thereto the system 300 will route video from the camera 118 to the display 202 allowing the driver of the first vehicle 100 to see additional vehicles 616 on the cross street 614. FIG. 11 is a graph 1100 including a plot 1102 of measured lateral distance to from the first vehicle 100 to proximate objects versus the position of the first vehicle 100 for the third scenario illustrated in FIG. 10.

FIG. 12 is a fourth schematic representation of a driving environment illustrating a fourth scenario 1200 in which the system 300 for controlling the camera 118 and the display 202 at intersections is used. In the fourth scenario 1200 the first vehicle 100 is driving on a street 1202 between two buildings 1204 that have irregularly shaped facades 1206. The irregularly shaped facades 1206 undulate in square wave like fashion. As the first vehicle 100 drives between the two buildings 1204 the proximity sensor system 316 registers distances to proximate objects to the side of the vehicle that alternate between being below the lateral distance threshold and above the lateral distance threshold. FIG. 13 is a graph 1300 including a plot 1302 of measured lateral distance to proximate objects versus vehicle position for the fourth scenario illustrated in FIG. 12. The plot 1302 shows how the measured lateral distances alternates between being above and below the lateral distance threshold. The fourth scenario can confound the methods 400, 500 described above with reference to FIGS. 4-5, leading to frequent unneeded routing of video from the camera 118 to the display 202. To address the fourth scenario 1200 and other scenarios that would similarly create false triggers additional criteria and methods including such additional criteria, as described herein below, are provided.

Figure 14:
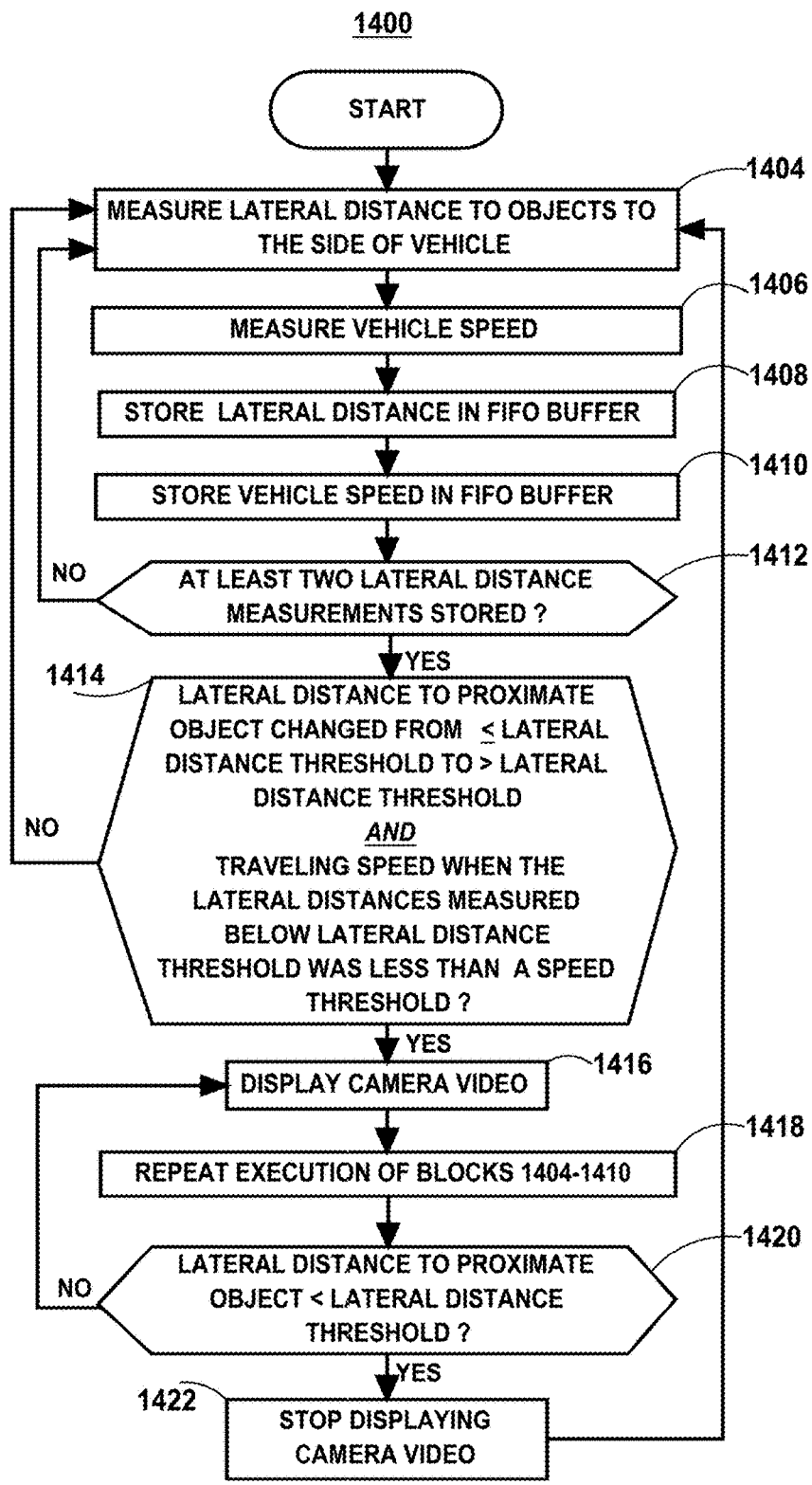
FIG. 14 is a flowchart of a third method of controlling the camera and the display of the vehicle shown in FIGS. 1-2 according to a third example provided in the present disclosure.

FIG. 14 is a flowchart of a third method 1400 of controlling the camera 118 and the display 202 of the first vehicle 100 according to a third example provided in the present disclosure. In block 1404 the lateral distance to objects to at least one side of the first vehicle 100 is measured. The lateral distance to objects on both sides of the vehicle 100 or only one side of the vehicle 100 may be measured, as discussed above. In block 1406 the speed of the vehicle 100 is measured using the vehicle speed sensor 204. In block 1408 the lateral distance that was measured in block 1404 is stored in a first First-In-First-Out (FIFO) buffer 1500 (FIG. 15). The first FIFO buffer 1500 (FIG. 15) can be implemented in the memory 304 as a circular buffer. In block 1410 the vehicle speed that was measured in block 1406 is stored in a second FIFO buffer 1600 (FIG. 16). Next decision block 1412 tests if at least two lateral distance measurements have been stored (and by implication if at least two vehicle speed measurements have been stored). When, initially, the outcome of decision block 1412 is negative, the method 1400 loops back to block 1404 in order to re-execute blocks 1404-1410. Once blocks 1404-1410 have been executed twice a transition from the lateral distance being below the lateral distance threshold to being above the lateral distance threshold can be detected. When the outcome of decision block 1412 is positive, the method 1400 proceeds to decision block 1414 the outcome of which depends on whether the lateral distance to proximate objects changed from less than lateral distance threshold to more than the lateral distance AND (in this specification a capitalized AND is a Boolean AND) the traveling speed when the lateral distance measured below the lateral distance threshold was less than a programmed speed threshold. Alternatively the traveling speed when the lateral distance measured above the lateral distance threshold can be used in block 1414. A positive outcome of decision block 1414 is construed to mean that the vehicle 100 has reached an intersection and the method 1400 proceeds to block 1416 in which the video from the camera 118 is displayed on the display 202. Including the speed criteria in 1414 is useful in avoiding false signals as it avoids triggering display of the video from the camera 118 when the vehicle 100 drives past a proximate object at a speed that would tend to indicate that the vehicle 100 has not approached an intersection. When the outcome of decision block 1414 is negative the method 1400 loops back to block 1404 and continues executing as described above. When the outcome of decision block 1414 is positive, after block 1416 and while continuing to display the video from the camera 118, the method 1400 proceeds to block 1418 which signifies repeating execution of blocks 1404-1410 which results in new lateral distance and vehicle speed measurements being stored in the FIFO buffers 1500, 1600. After block 1418 the method 1400 proceeds to decision block 1420 the outcome of which depends on whether the lateral distance to proximate objects, as reflected in the last lateral distance measurement, is now once again less than the lateral distance threshold. If the outcome of decision block 1420 is negative the method loops back to decision block 1416 and continues execution as described above. When the outcome of decision block 1420 is positive the method 1400 proceeds to block 1422 in which displaying of the video from the camera 118 on the display 202 is stopped. After executing block 1422 the method 1400 loops back to block 1404 and continues executing as previously described.

FIG. 15 is a table representing the first FIFO buffer 1500 which includes lateral distance measurements at a sequence of times denoted $T_0, T_{-1} \ldots T_{-K} \ldots T_{-N}$ with $T_0$ being the most recent time. FIG. 16 is a table representing the second FIFO buffer 1600 which includes vehicle speed at the sequence of times $T_0, T_{-1} \ldots T_{-K} \ldots T_{-N}$. Note however that there can also be an offset between the times at which the lateral distance measurements are obtained and the times at which the vehicle speed measurements are obtained.

FIG. 17 is portion of a flowchart 1700 including an alternative condition that may be substituted into the flowchart shown in FIG. 14 according to fourth example of a method 1700 of controlling a camera and a display of a vehicle. Decision block 1714 shown in FIG. 17 can be used in lieu of decision block 1414 of method 1400. Decision block 1714 tests whether the lateral distance to proximate objects changed from less than the lateral distance threshold to more than the lateral distance AND (Boolean AND) the distance travelled while the lateral distance was less than the lateral distance threshold was greater than a preprogrammed travel distance threshold. The use of the condition involving the travel distance threshold serves to avoid false triggers that could occur when the vehicle 100 being driven along a road passes a small closely spaced object, such as, for example, a mailbox positioned close to the road.

Figure 18:
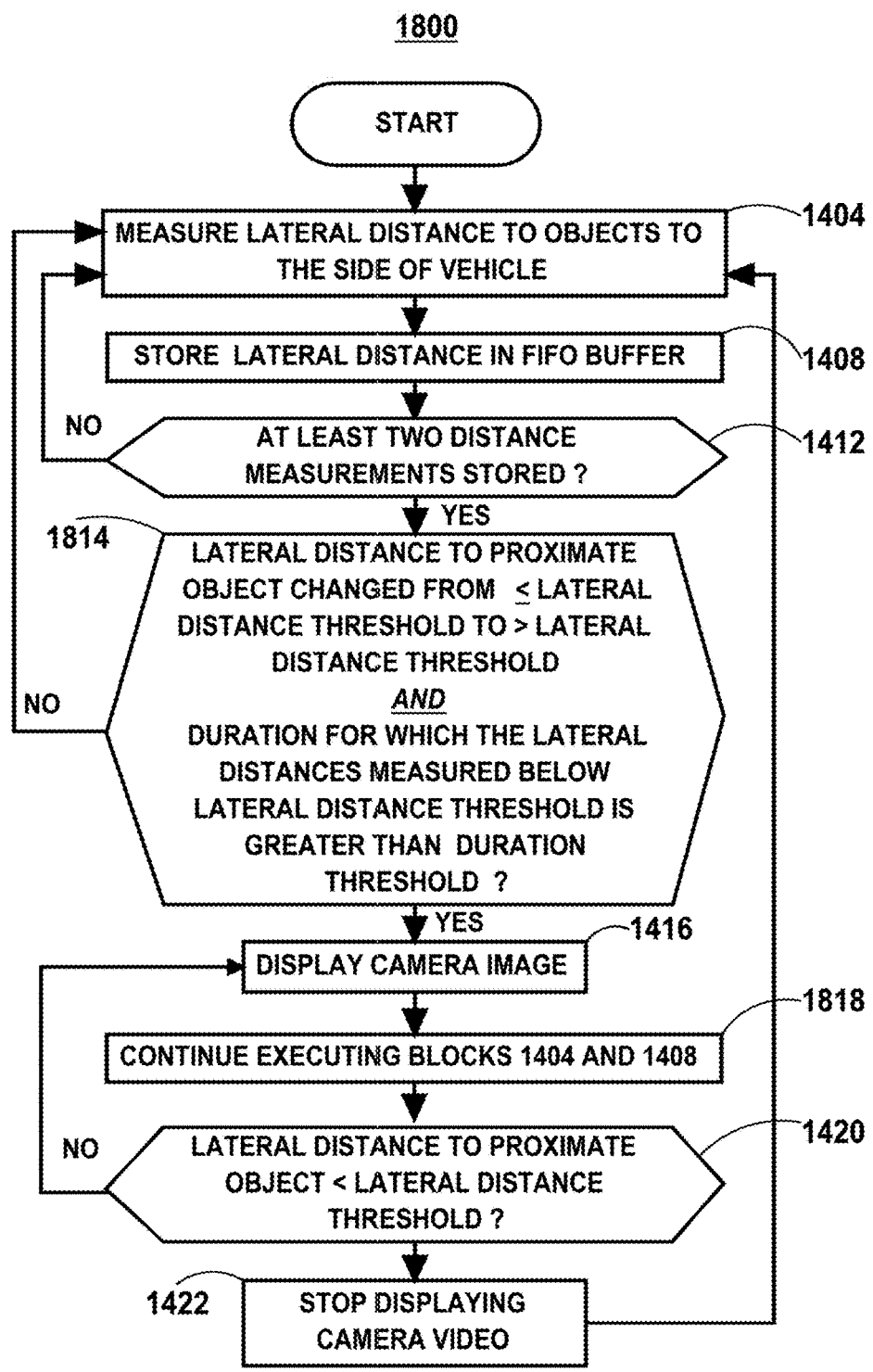
FIG. 18 is a flowchart of a fifth method of controlling a camera and a display of a vehicle according to a fifth example provided in the present disclosure.

FIG. 18 is a flowchart of a fifth method 1800 of controlling the camera 118 and the display 202 of the vehicle 100 according to a fifth example provided in the present disclosure. The method 1800 includes the blocks 1404, 1408, 1412, 1416, 1420 and 1422 in common with the method 1400 shown in FIG. 14 and described above. The method 1800 does not measure vehicle speed so blocks 1406 and 1410 are not included. Decision block 1814 which takes the place of decision block 1414 tests if the lateral distance to proximate objects changed from less than the lateral distance threshold to more than the lateral distance threshold AND (Boolean AND) the duration for which the lateral distance measured below the lateral distance threshold was greater than a duration threshold. Including such duration related criteria in decision block 1814 filters out false triggers due to the vehicle passing objects positioned close to the edge of the road such as a mailbox. Block 1818 represents repetition of blocks 1404 and 1408.

Figure 19:
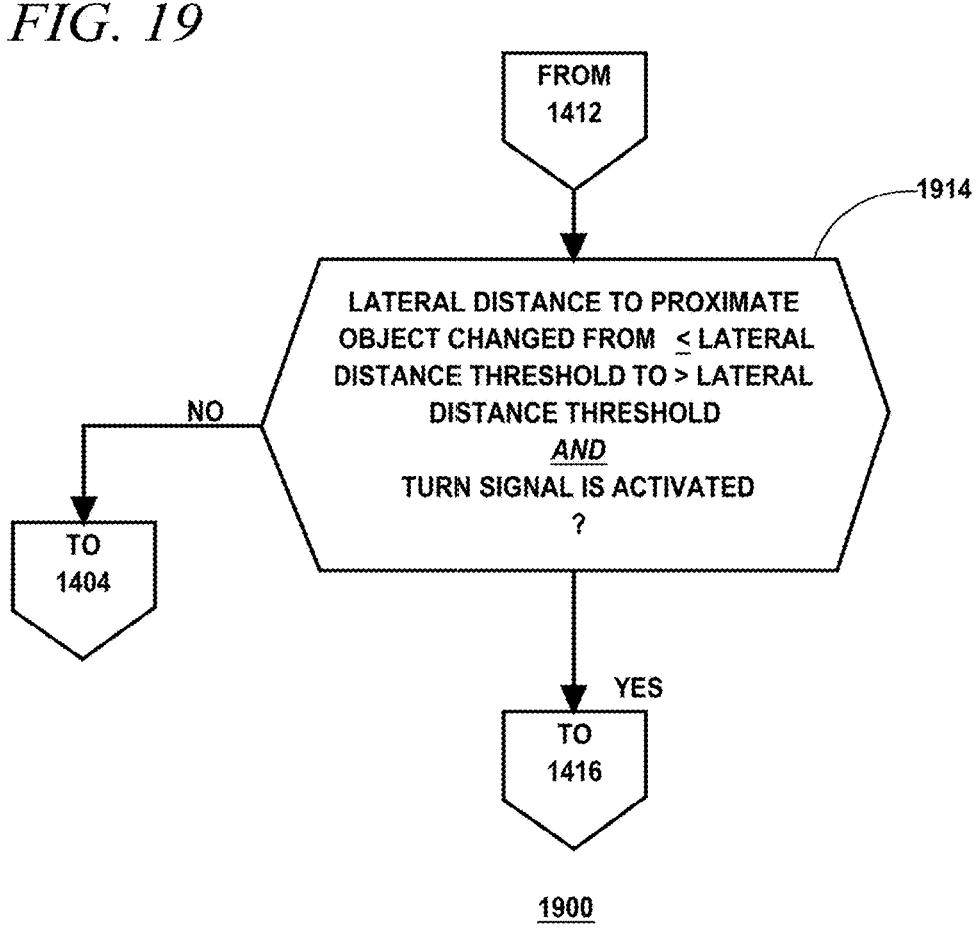
FIG. 19 is a portion of a flowchart including an alternative condition that may be substituted into the flowchart shown in FIG. 18 according to a sixth example of a method of controlling a camera and a display of a vehicle.

FIG. 19 is a portion of a flowchart 1900 including an alternative condition that may be substituted into the flowchart shown in FIG. 18 according to a sixth example of a method of controlling a camera and a display of a vehicle. Decision block 1914 can be used in lieu of decision block 1814. Decision block 1914 tests if the lateral distance to objects proximate to the vehicle 100 changed from less than the lateral distance threshold to greater than the lateral distance threshold AND (Boolean AND) a turn signal (not shown) of the vehicle 100 has been activated. Alternatively a Boolean OR is used in block 1914 in lieu of the Boolean AND. Also alternatively, the status of the turn signal (not shown) and/or a brake switch (not shown) of the vehicle 100 by is used to determine if the camera 118 will display video from the camera 118.

Figure 20:
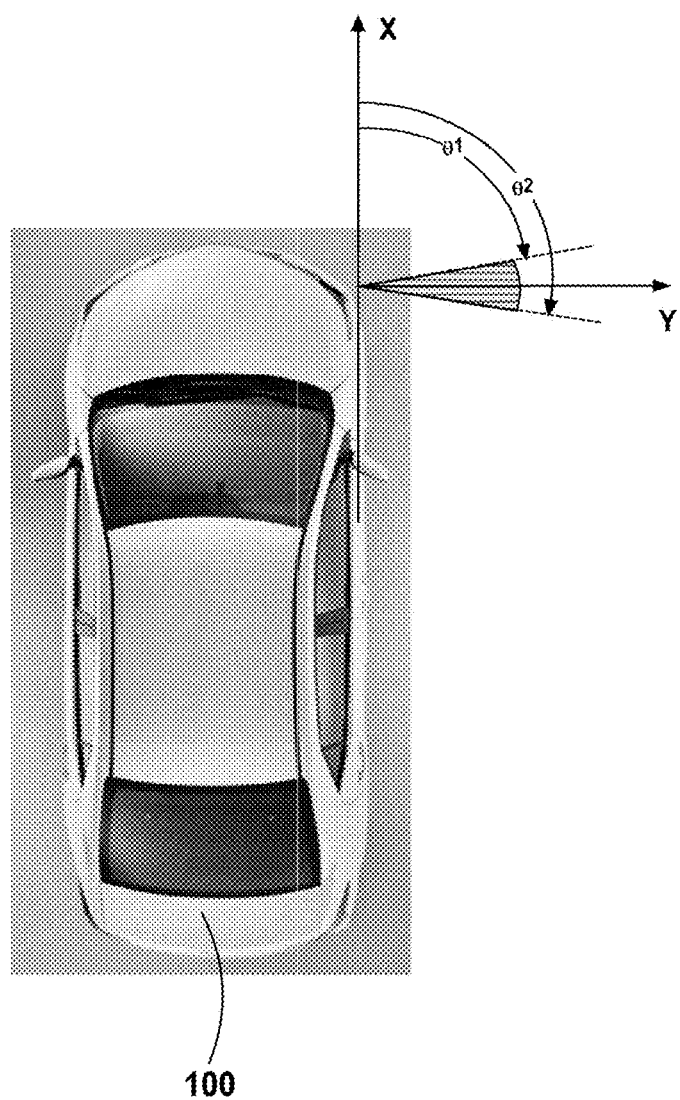
FIG. 20 depicts a field of view for a lateral proximity sensor for the vehicle shown in FIGS. 1-2 according to a first example.

FIG. 20 depicts a field of view for a lateral proximity sensor (e.g., sonar, radar, LIDAR) for the vehicle 100 shown in FIGS. 1-2 according to a first example. The field of view extends a first angle θ1 to a second angle θ2. θ1 and θ2 are measured with respect to a longitudinal axis of the vehicle 100 which is parallel to an X-axis shown in FIGS. 20-21. θ1 is suitably between 80° and 85° from the vehicle longitudinal axis (X-axis). θ2 is greater than θ1 and is suitably between 95° and 100°. In FIG. 20 θ1 is equal to 85° and θ2 is equal to 95°. According to certain embodiments the horizontal extent of the field of view, i.e., the difference between θ2 and θ1 is at least 10°. According to certain embodiments the field of view of the proximity sensor includes at least one angle in the approximate range of 75° and 85°.

Figure 21:
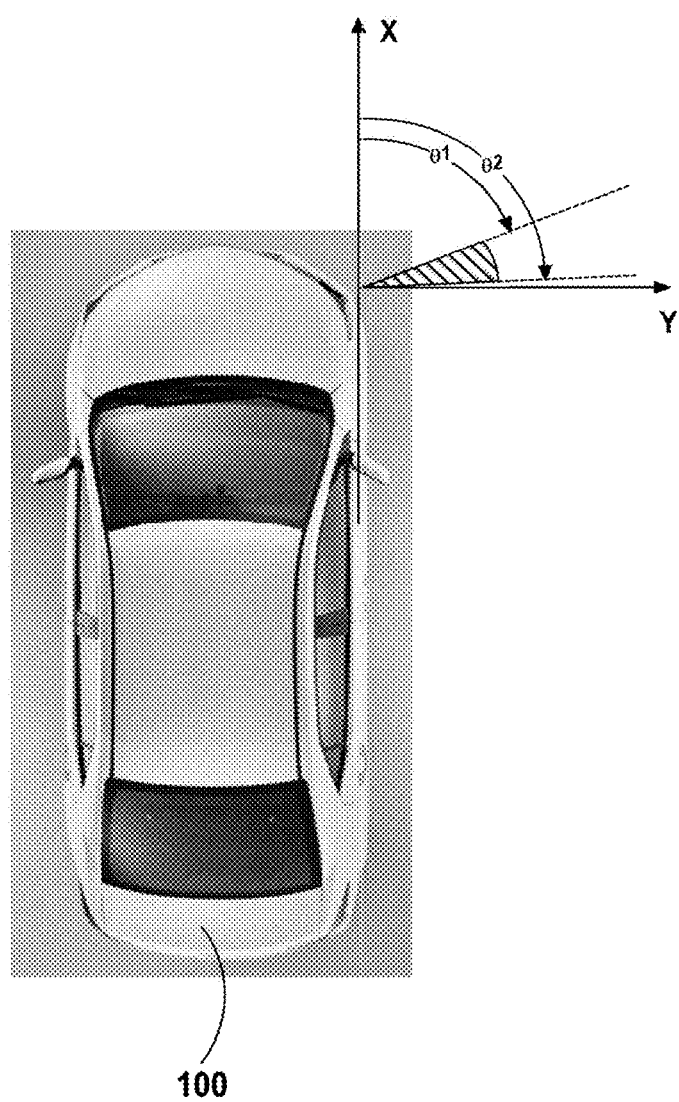
FIG. 21 depicts a field of view for a lateral proximity sensor for the vehicle shown in FIGS. 1-2 according to a second example.

FIG. 21 depicts a field of view for a lateral proximity sensor for the vehicle 100 shown in FIGS. 1-2 according to a second example. In FIG. 21 θ1 is equal to 75° and θ2 is equal to 88°.

Numerous modifications and variations of the present invention are possible in light of the above teachings. It is therefore to be understood that within the scope of the appended claims, the invention may be practiced otherwise than as specifically described herein.

I claim:

1. A vehicle comprising:
a front;
a first side;
a second side;
a proximity sensor configured to sense a distance to objects located to at least one of the first side and the second side of the vehicle;
a camera mounted at the front of the vehicle, the camera configured to include a field of view that includes a view to at least one of the first side and the second side of the vehicle;
a display in the vehicle; and
processing circuitry coupled to the proximity sensor, the camera, and the display, wherein the processing circuitry is configured to:
determine that, at least, the proximity sensor has detected a transition of the vehicle from surroundings of the vehicle in which at least one object located to at least one of the first side of the vehicle and the second side of the vehicle is within a predetermined proximity threshold distance to surroundings of the vehicle in which no objects are located to the at least one of the first side of the vehicle and the second side of the vehicle within the predetermined proximity threshold distance, and
in response to determining that, at least, the proximity sensor has detected the transition, the processing circuitry is configured to display video from the camera on the display of the vehicle, wherein
in determining that, at least, the proximity sensor has detected the transition, the processing circuitry is further configured to determine that prior to the transition the vehicle was traveling at a speed less than a predetermined speed threshold, and
the display of the video from the camera on the display is also conditioned on the vehicle having been traveling at the speed less than the predetermined speed threshold prior to the transition.

2. The vehicle according to claim 1 wherein:
in determining that, at least, the proximity sensor has detected the transition, the processing circuitry is further configured to determine that prior to the transition, the vehicle had traveled a distance at least equal to a predetermined travel distance while the vehicle was in the surroundings of the vehicle in which at least one object was located to at least one of the first side of the vehicle and the second side of the vehicle within the predetermined proximity threshold distance.

3. The vehicle according to claim 1 wherein:
in determining that, at least, the proximity sensor has detected the transition, the processing circuitry is further configured to determine that prior to the transition, for at least a predetermine period of time the vehicle was in the surroundings of the vehicle in which at least one object was located to at least one of the first side of the vehicle and the second side of the vehicle within the predetermined proximity threshold distance.

4. The vehicle according to claim 1 wherein:
in determining that, at least, the proximity sensor has detected the transition, the processing circuitry is further configured to determine when a turn signal of the vehicle has been activated.

5. The vehicle according to claim 1 wherein:
the proximity sensor has a horizontal field of view at least partly overlaps the range of 75° to 85° degrees from a longitudinal axis of the vehicle.

6. The vehicle according to claim 1 wherein:
the field of view of the proximity sensor has a horizontal angular extent of at least 10 degrees.

7. A method of operating a camera and a display of a vehicle in response to a proximity sensor of the vehicle, the method comprising:
determining with processing circuitry that, at least, the proximity sensor has detected a transition of the vehicle from surroundings of the vehicle in which at least one object located to at least one of the first side of the vehicle and the second side of the vehicle is within a predetermined proximity threshold distance to surroundings of the vehicle in which no objects are located to the at least one of the first side of the vehicle and the second side of the vehicle within the predetermined proximity threshold distance; and
in response to determining that, at least, the proximity sensor has detected the transition, using the processing circuitry to display video from the camera on the display of the vehicle, wherein
determining that, at least, the proximity sensor has detected the transition, includes determining with the processing circuitry that prior to the transition the vehicle was traveling at a speed less than a predetermined speed threshold, and
the display of the video from the camera on the display is also conditioned on the vehicle having been traveling at the speed less than the predetermined speed threshold prior to the transition.

8. The method according to claim 7 wherein:
determining that, at least, the proximity sensor has detected the transition, includes determining that prior to the transition, the vehicle had traveled a distance at least equal to a predetermined travel distance while the vehicle was in the surroundings of the vehicle in which at least one object was located to at least one of the first side of the vehicle and the second side of the vehicle within the predetermined proximity threshold distance.

9. The method according to claim 7 wherein:
determining that, at least, the proximity sensor has detected the transition, includes determining that prior to the transition, for at least a predetermine period of time the vehicle was in the surroundings of the vehicle in which at least one object was located to at least one of the first side of the vehicle and the second side of the vehicle within the predetermined proximity threshold distance.

10. The method according to claim 7 wherein:
determining that, at least, the proximity sensor has detected the transition, includes determining when a turn signal of the vehicle has been activated.

11. A non-transitory computer readable medium including programming instructions for
operating a camera and a display of a vehicle in response to a proximity sensor of the vehicle, including programming instructions for:
determining with processing circuitry that, at least, the proximity sensor has detected a transition of the vehicle from surroundings of the vehicle in which at least one object located to at least one of the first side of the vehicle and the second side of the vehicle is within a predetermined proximity threshold distance to surroundings of the vehicle in which no objects are located to the at least one of the first side of the vehicle and the second side of the vehicle within the predetermined proximity threshold distance; and
in response to determining that, at least, the proximity sensor has detected the transition, using the processing circuitry to display video from the camera on the display of the vehicle, wherein
determining that, at least, the proximity sensor has detected the transition, includes determining with the processing circuitry that prior to the transition the vehicle was traveling at a speed less than a predetermined speed threshold, and
the display of the video from the camera on the display is also conditioned on the vehicle having been traveling at the speed less than the predetermined speed threshold prior to the transition.

12. The non-transitory computer readable medium according to claim 11 further including programming instructions for:
determining that, at least, the proximity sensor has detected the transition, includes determining that prior to the transition, the vehicle had traveled a distance at least equal to a predetermined travel distance while the vehicle was in the surroundings of the vehicle in which at least one object was located to at least one of the first side of the vehicle and the second side of the vehicle within the predetermined proximity threshold distance.

13. The non-transitory computer readable medium according to claim 11 further including programming instructions for:
determining that, at least, the proximity sensor has detected the transition, includes determining that prior to the transition, for at least a predetermine period of time the vehicle was in the surroundings of the vehicle in which at least one object was located to at least one of the first side of the vehicle and the second side of the vehicle within the predetermined proximity threshold distance.

14. The non-transitory computer readable medium according to claim 11 further including programming instructions for:
    determining that, at least, the proximity sensor has detected the transition, includes determining when a turn signal of the vehicle has been activated.

\* \* \* \* \*